United States Patent
Guenther

(10) Patent No.: US 12,485,962 B2
(45) Date of Patent: Dec. 2, 2025

(54) METHOD FOR CALIBRATING AND/OR INITIALIZING A STEERING SENSOR OF A STEERING SYSTEM

(71) Applicant: Robert Bosch GmbH, Stuttgart (DE)

(72) Inventor: Christian Guenther, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 18/699,130

(22) PCT Filed: Sep. 19, 2022

(86) PCT No.: PCT/EP2022/075963
§ 371 (c)(1),
(2) Date: Apr. 5, 2024

(87) PCT Pub. No.: WO2023/061702
PCT Pub. Date: Apr. 20, 2023

(65) Prior Publication Data
US 2025/0229832 A1     Jul. 17, 2025

(30) Foreign Application Priority Data

Oct. 11, 2021   (DE) .................... 10 2021 211 415.6

(51) Int. Cl.
*B62D 6/10*       (2006.01)
*B60W 50/00*     (2006.01)
(Continued)

(52) U.S. Cl.
CPC ............... *B62D 6/10* (2013.01); *B60W 50/00* (2013.01); *B62D 5/001* (2013.01); *B62D 15/021* (2013.01);
(Continued)

(58) Field of Classification Search
CPC . B62D 6/10; B62D 1/046; B62D 1/06; B62D 1/286; B62D 6/00; B62D 1/04;
(Continued)

(56) References Cited

U.S. PATENT DOCUMENTS

2020/0264062 A1*   8/2020   Park .................... G01L 25/003

FOREIGN PATENT DOCUMENTS

DE         101 61 619 A1    6/2002
DE    10 2007 021 625 A1   11/2008
(Continued)

OTHER PUBLICATIONS

International Search Report corresponding to PCT Application No. PCT/EP2022/075963, mailed Feb. 15, 2023 (German and English language document) (5 pages).

*Primary Examiner* — Yi-Kai Wang
(74) *Attorney, Agent, or Firm* — Maginot, Moore & Beck LLP

(57) ABSTRACT

A method is for calibrating and/or initializing a steering sensor of a steering system, in particular during operation of the steering system in a vehicle. The steering system includes a steering handle and a torque sensor associated with the steering handle. The steering sensor is configured to detect a deflection position of the steering handle. A torque parameter is determined by determining a torque for each of a plurality of different deflection positions of the steering handle, and is compared with a reference parameter in order to calibrate and/or initialize the steering sensor.

10 Claims, 3 Drawing Sheets

(51) Int. Cl.
*B62D 5/00* (2006.01)
*B62D 15/02* (2006.01)

(52) U.S. Cl.
CPC ............ *B60W 2050/0057* (2013.01); *B60W 2050/0083* (2013.01); *B60W 2510/202* (2013.01); *B60W 2540/18* (2013.01)

(58) Field of Classification Search
CPC ............ B60W 10/20; B60W 50/14; B60W 2040/0818; B60W 40/09; G01V 3/08
USPC .......................................................... 701/41
See application file for complete search history.

(56) References Cited

FOREIGN PATENT DOCUMENTS

| | | |
|---|---|---|
| DE | 10 2008 037 870 B4 | 2/2009 |
| DE | 10 2010 029 056 A1 | 11/2011 |
| DE | 10 2016 209 741 A1 | 12/2016 |
| DE | 10 2018 117 308 A1 | 1/2019 |
| DE | 10 2018 123 615 A1 | 3/2019 |
| DE | 10 2019 107 768 A1 | 10/2019 |
| DE | 10 2019 121 522 A1 | 2/2020 |

\* cited by examiner

METHOD FOR CALIBRATING AND/OR INITIALIZING A STEERING SENSOR OF A STEERING SYSTEM

This application is a 35 U.S.C. § 371 National Stage Application of PCT/EP2022/075963, filed on Sep. 19, 2022, which claims the benefit of priority to Serial No. DE 10 2021 211 415.6, filed on Oct. 11, 2021 in Germany, the disclosures of which are incorporated herein by reference in their entirety.

The disclosure proceeds from a method for calibrating and/or initializing a steering sensor of a steering system. The disclosure also relates to a control unit having a computing unit for performing such a method.

BACKGROUND

Known from the prior art are vehicles comprising a conventional steering system having a steering handle, for example in the form of a steering wheel, a wheel steering angle actuator in the form of a steering gear, and a steering shaft for mechanically connecting the steering handle to the wheel steering angle actuator. Further known are vehicles having steer-by-wire steering systems which omit a direct mechanical connection between a steering handle and the steered vehicle wheels, and in which a steering preference at the steering handle is relayed exclusively electrically. The latter systems comprise an operating unit actuatable by a driver and by at least one wheel steering angle actuator which is mechanically separate from the operating unit. Furthermore, in both cases, such steering systems comprise sensors, e.g. torque sensors and/or steering angle sensors, for controlling operation of the steering system. Such steering systems are, e.g., known from DE 10 2008 037 870 B4 and DE 10 2018 123 615 A1.

The sensors used are also safety-critical components, which must be calibrated and/or adjusted particularly precisely in order to avoid errors while driving. Corresponding calibration is usually performed manually during manufacture or manually in a workshop using special tools, e.g. a leveling tool. However, simple recalibration, which can be necessary due to, e.g., aging and/or wear effects, as well as automation cannot be achieved using the known calibration methods.

Therefore, the object of the disclosure is in particular to provide a method for calibrating and/or initializing a steering sensor and vehicle, the method providing improved features with respect to operational safety and/or functionality.

SUMMARY

The disclosure proceeds from a method, in particular a computer-implemented method, for, in particular automatic and/or automated, calibration and/or initialization of a steering sensor of a steering system, in particular during operation of the steering system in a vehicle, whereby the steering system comprises a steering handling and a torque sensor associated with the steering handling. The torque sensor is provided to detect a torque acting on the steering handling in particular. The steering sensor is intended to detect a deflection position of the steering handle. The term "intended" is in particular understood to mean specifically programmed, designed, and/or equipped. The phrase "an object being intended for a specific function" is particularly intended to mean that the object fulfills and/or performs this specific function in at least one application and/or operating state.

It is proposed that a torque parameter be determined by determining, in particular by means of the torque sensor, a torque for a plurality of different deflection positions of the steering handle, in particular associated with the corresponding deflection position, and is compared with a reference parameter for the, in particular automatic and/or automated, calibration and/or initialization of the steering sensor. The torque parameter accordingly comprises multiple pairs of values from the deflection position of the steering handle and associated torque. For example, the reference parameter could be a further torque parameter equivalent to the torque parameter determined by means of a further, e.g. redundant, torque sensor. However, it is advantageous to use a previously applied factory setting for the torque parameter as the reference parameter. In this case, the reference parameter can, e.g., be determined in advance by means of test measurements, e.g. on a calibrated reference system, and stored in an operational memory of the vehicle. More preferably, the torque parameter and reference parameter are vectors. The comparison is then used to determine a difference and/or deviation between the torque parameter and the reference parameter and to calibrate and/or initialize the steering sensor. Operational safety can be increased and/or functionality can be improved by means of this configuration. In particular, a particularly precisely calibrated and/or adjusted steering sensor can be provided. In addition, flexibility can be increased and advantageous adjustment to altered operating conditions can be achieved.

Advantageously, torque is determined for at least four, preferably at least 20, and more preferably for at least 30, different deflection positions of the steering handle. Preferably, the deflection positions are also evenly distributed over an entire deflection range of the steering handle. If the steering handling is designed as a steering wheel, then the entire deflection region is identical to a full revolution of the steering wheel. A particularly simple and/or exact evaluation as well as calibration and/or initialization of the steering sensor can thereby be achieved.

Furthermore, it is proposed that a Fourier transform, in particular a discrete Fourier transform (DFT), or preferably a fast Fourier transform (FFT), is used to compare the torque parameter and the reference parameter. If the torque parameter corresponds to a sine signal, the calibration and/or initialization of the steering sensor can be performed directly based on a result of the Fourier transform. In this case, a difference and/or a deviation between the torque parameter and the reference parameter can advantageously be determined based on a real and an imaginary component, in particular angular component, of the result of the Fourier transform and used for calibrating and/or initializing the steering sensor. In particular, a particularly simple and/or resource-saving evaluation algorithm can be achieved thereby.

Furthermore, it is proposed that a cross-correlation is used to compare the torque parameter and the reference parameter. In particular, a cross-correlation between the torque parameter and the reference parameter is calculated. Advantageously, in this context, a difference and/or a deviation between the torque parameter and the reference parameter is determined based on a maximum of the cross-correlation and used for calibrating and/or initializing the steering sensor. Such an evaluation is particularly useful if the torque parameter deviates from a sine signal by a certain amount. In particular, a particularly exact evaluation can be achieved thereby, whereby a precisely calibrated and/or adjusted steering sensor can advantageously be provided.

For example, the steering handle could be deflected manually and/or by hand to determine the torque parameter. However, it is preferably proposed that the steering system comprises at least one, in particular electrical and/or electronic, actuator unit, which is operatively connected to the steering handle, and that the steering handle is deflected by actuating the actuator unit in order to determine the torque parameter. In particular, the steering handling is automatically and/or automatedly deflected by actuating the actuator unit, whereby a corresponding torque is determined when the respective deflection position is reached by means of the torque sensor, and whereby the corresponding torque value is saved as a pair of values along with the corresponding deflection position. The total of all such determined pairs of values from the deflection position of the steering handle and associated torque then forms the torque parameter. Furthermore, the steering system can in this case be designed as a conventional steering system, in particular as a power steering system, and can comprise a mechanical access means. In this case, the actuator unit can be designed as a steering actuator used to support a manual torque applied to the steering handle. However, it is preferable for the steering system to be designed as a steer-by-wire steering system and for it to comprise, in particular an operating unit and at least one wheel steering angle actuator which is mechanically separate from the operating unit, said steering angle actuator being intended for changing a wheel steering angle of at least one vehicle wheel as a function of a steering preference. In this case, the actuator unit is preferably part of the operating unit and is mechanically coupled to the steering handle. It is particularly preferable for the actuator unit to be designed as a feedback actuator for generating a steering resistance and/or a restoring torque onto the steering handle. In addition, the actuator unit is advantageously designed as an electric alternating current motor, in particular as a synchronous motor, and in particular preferably as a permanently-excited synchronous motor, and is preferably actuated in at least one operating state using a signal from the torque sensor and/or the steering sensor. Advantageous automation can thereby be achieved.

If the torque parameter is determined at a time and/or in a state in which no contact with the steering handle occurs and/or takes place, in particular a so-called hands-off state, the torque parameter can also advantageously be determined precisely and independently of external influences.

Furthermore, the disclosure relates to a control unit having a computing unit for performing the previously described method. The term "computing unit" is in particular intended in this context to mean an electrical and/or electronic unit which comprises an information input, an information processor, and an information output. The computing unit advantageously further comprises at least one processor, at least one operating memory, at least one input and/or output means, at least one operating program, at least one control routine, at least one feedback control routine, at least one detection routine, at least one calculation routine, and/or at least one calibration routine. In particular, the computing unit is provided to determine the torque parameter. The computing unit is in particular provided to determine a torque for a plurality of different deflection positions of the steering handle and to generate a torque parameter therefrom.

Furthermore, the computing unit is particularly provided to compare the torque parameter with a reference parameter for calibrating and/or initializing the steering sensor. Furthermore, the computing unit can be provided to actuate the actuator unit and thereby automatically and/or automatedly deflect the steering handling. Preferably, the computing unit is integrated into a control unit of the vehicle, advantageously into a control unit designed as a steering control unit. Doing so can in particular achieve the aforementioned advantages.

Further proposed is a vehicle, in particular a motor vehicle having a steering system which comprises a steering handle, a steering sensor associated with the steering handling for detecting a deflection position of the steering handling and a torque sensor assigned to the steering handling for detecting a torque, and having a computing unit, which is intended for determining a respective torque for a plurality of different deflection positions of the steering handle and generating a torque parameter therefrom, the computing unit being intended for comparing the torque parameter with a reference parameter in order to calibrate and/or initialize the steering sensor. The steering system can be designed as a conventional steering system, in particular as an electric power steering system, and can comprise a mechanical accessing means. However, it is preferable for the steering system to be designed as a steer-by-wire steering system and for it to comprise, in particular, an operating unit and at least one wheel steering angle actuator which is mechanically separate from the operating unit, said steering angle actuator being intended for changing a wheel steering angle of at least one vehicle wheel as a function of a steering preference. This can in particular achieve the aforementioned advantages.

The method for calibrating and/or initializing the steering sensor, the control unit, and the vehicle are not intended to be limited to the application and embodiment described hereinabove. In particular, the method for calibrating and/or initializing the steering sensor, the control unit and the vehicle can include a number of individual elements, components, and units that differ from a number specified herein to perform a function described herein.

BRIEF DESCRIPTION OF THE DRAWINGS

Further advantages will become apparent from the description of the drawings hereinafter. The drawings illustrate one exemplary embodiment of the disclosure. Shown are.

DETAILED DESCRIPTION

Figure 1A:
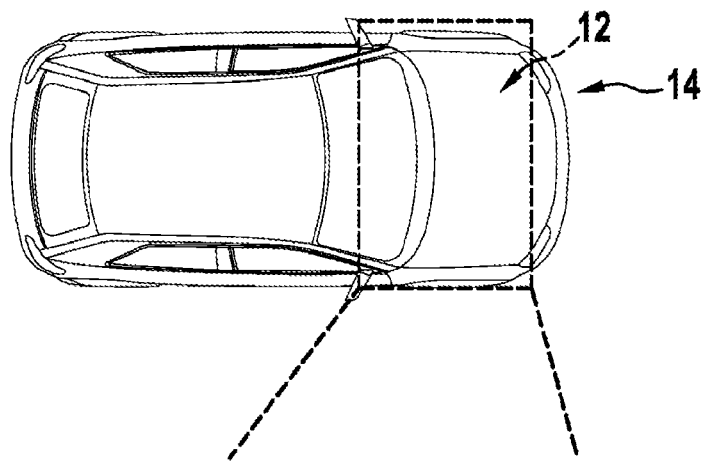
FIGS. 1*a-b* a vehicle comprising a steer-by-wire steering system in a simplified illustration, FIGS. 2*a-b* exemplary diagrams of various signals for calibrating and/or initializing a steering sensor of the steering system, and FIG. 3 an exemplary flowchart showing the main method steps of a method for calibrating and/or initializing the steering sensor.
Figure 1B:
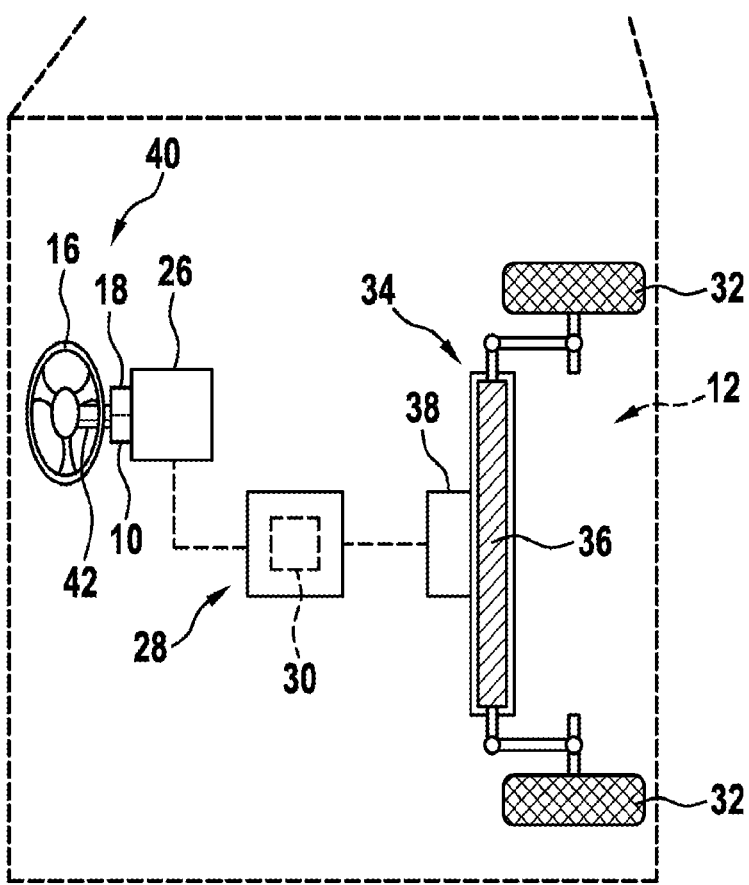

FIGS. 1*a* and 1*b* show a simplified illustration of a vehicle 14 which is, e.g., designed as a passenger vehicle comprising multiple vehicle wheels 32 and a steering system 12. The steering system 12 is operatively connected to the vehicle wheels 32, and is provided to influence a direction of travel of the vehicle 14. The steering system 12 is further designed as a steer-by-wire steering system in the present case, in which a steering preference is electrically transmitted to the vehicle wheels 32 in at least one operating state. In principle, however, a steering system could also be designed as a conventional steering system, in particular as an electric power steering system.

The steering system 12 comprises a known wheel steering angle actuator 34. The wheel steering angle actuator 34 is, e.g., designed as a central actuator. The wheel steering angle actuator 34 is operatively connected to at least two of the vehicle wheels 32, in particular two front wheels, and is intended for translating the steering preference into a steering movement of the vehicle wheels 32. For this purpose, the wheel steering angle actuator 34 comprises a steering actuating element 36 designed, e.g., as a gear rack, and an actuator unit 38 which cooperates with the steering actuating element 36. The actuator unit 38 is designed as a steering actuator, in particular an electric motor, and is intended for controlling the steerable vehicle wheels 32. A steering system could in principle basically also comprise multiple wheel steering angle actuators, in particular designed as single-wheel actuators. An actuator unit could further comprise a multiple electric motors. In addition, a wheel steering angle adjuster could in principle also be designed as a conventional steering gear, and could be mechanically connected to a steering handle via a steering shaft.

The steering system 12 further comprises an operating unit 40, in particular actuatable by a driver and/or an occupant. The wheel steering angle actuator 34 is designed to be mechanically separate from the operating unit 40. The wheel steering angle actuator 34 is only electrically connected to the operating unit 40. The operating unit 40 comprises a steering handle 16, e.g. in the form of a steering wheel, and a further actuator unit 26 which is in particular mechanically coupled to the steering handle 16. The further actuator unit 26 is designed as a feedback actuator and is provided at least for generating a steering resistance and/or a restoring torque on the steering handle 16. To this end, the further actuator unit 26 comprises an electric motor (not shown) designed in particular as a permanently-excited synchronous motor. In addition, the operating unit 40 comprises a torsion element 42, in the present case in particular a rotating rod, which is provided as a means of rotation as a function of a movement of the steering handle 16. A steering handle could alternatively also be designed as a joystick, a steering lever, and/or as a steering ball or the like. A further actuator unit could also comprise multiple electric motors. It is also conceivable to connect an operating unit and a wheel steering angle actuator together by means of a steering shaft, e.g. in a conventional steering system. In this case, a further actuator unit could be omitted.

The steering system 12 further comprises at least one torque sensor 18. In the present case, the torque sensor 18 is part of the operating unit 40 and is arranged in particular in the area of the torsion element 42. The torque sensor 18 is thereby associated with the steering handling 16. The torque sensor 18 is provided to detect a torque caused by the steering handle 16 and correlated to a rotation of the torsion element 42. In principle, however, a torque sensor could also be designed separately from an operating unit, for example as in a conventional steering system.

In addition, the steering system 12 comprises at least one steering sensor 10. In the present case, the steering sensor 10 is part of the operating unit 40. The steering sensor 10 is thereby associated with the steering handling 16. The steering sensor 10 is provided to detect a deflection position of the steering handle 16. In the present case, the steering sensor 10 is, e.g., designed as a steering angle sensor and is intended for detecting a steering angle. In principle, however, a steering sensor could also be designed separately from an operating unit, for example as in a conventional steering system. In addition, it is conceivable that a steering sensor can be positioned directly on a steering handle.

The vehicle 14 further comprises a control unit 28. In the present case, the control unit 28 is designed as a central steering control unit, and is therefore part of the steering system 12. The control unit 28 comprises an electrical connection to the wheel steering angle actuator 34. The control unit 28 further comprises an electrical connection to the operator unit 40, in particular the torque sensor 18 and steering sensor 10. The control unit 28 is intended for controlling an operation of the steering system 12. In the present case, the control unit 28 is intended for actuating the actuator unit 38 as a function of a signal from the operating unit 40, e.g., as a function of a steering preference and/or a manual torque. The control unit 28 can furthermore be provided to actuate the further actuator unit 26 as a function of a signal from the wheel steering angle actuator 34.

The control unit 28 comprises a computing unit 30 for this purpose. The computing unit 30 comprises at least one processor (not depicted), e.g. in the form of a microprocessor, and at least one operating memory (not depicted). In addition, the computing unit 30 comprises at least one operating program stored in the operating memory having at least one control routine, at least one determination routine, at least one calculation routine, and at least one calibration routine. In principle, a vehicle could also comprise multiple control units, whereby a first control unit with at least a first computing unit is associated with an operating unit, whereas a second control unit with at least a second computing unit is associated with a wheel steering angle actuator. In this case, the first control unit and the second control unit could communicate electrically with each other. A control unit could in principle also be different from a steering system and, e.g., designed as a central vehicle control unit.

The sensors used are essentially safety-critical components. Accordingly, the torque sensor 18 and the steering sensor 10 must be calibrated and/or adjusted particularly precisely to avoid errors during travel. The following description focuses on a calibration and/or initialization of the steering sensor 10.

To increase operational safety and/or improve operation, a method for calibrating and/or initializing the steering sensor 10 is therefore described hereinafter. The method is performed in particular during operation of the steering system 12 and consequently the steering sensor 10 in the vehicle 14, and preferably while the vehicle 14 is stationary. For example, to perform the calibration and/or initialization of the steering sensor 10, the vehicle 14 can feature a specific service operating mode which can be activated by a driver and/or occupant of the vehicle 14 or by a service employee, e.g. via an on-board computer. In this case, performance of the method can in principle be repeated at regular time intervals or depending on the situation, such as at every system start or when required. In the present case, the computing unit 30 in particular provided to perform the method and in particular comprises a computer program having corresponding program code means for this purpose. Alternatively, however, a first computing unit of a first control unit, associated with an operating unit, could also be intended for performing the method. Furthermore, the method could alternatively or additionally also be performed during a driving operation of the vehicle 14, e.g. during automated driving operation.

In the present case, a torque parameter 20 is determined for calibrating and/or initializing the steering sensor 10 by determining, by means of the torque sensor 18, a torque for a plurality of different deflection positions of the steering handle 16. In the present case, a corresponding torque is determined for at least 30 different deflection positions of the steering handle 16, whereby the deflection positions are evenly distributed over an entire deflection region of the steering handle 16, i.e., in the present case a full revolution of the steering handle 16 designed as a steering wheel. To this end, the steering handle 16 is deflected automatically and/or automatedly by actuating the further actuator unit 26, whereby a corresponding torque is determined when the respective deflection position is reached by means of torque sensor 18. In addition, the corresponding value for the torque along with the corresponding deflection position is saved as a pair of values, e.g., in the operational memory of the computing unit 30. The torque parameter 20 accordingly comprises multiple pairs of values from the deflection position of the steering handle 16 and associated torque. Advantageously, the torque parameter 20 is in this case provided as a vector. Furthermore, the torque parameter 20 is determined at a time and/or in a state in which no contact with the steering handle 16 occurs and/or takes place, in particular what is referred to as a hands-off state in order to enable said determination independently of external influences.

The torque parameter 20 is then compared with a reference parameter 22 in order to calibrate and/or initialize the steering sensor 10. The reference parameter 22 is also advantageously provided as a vector. Based on the comparison, a difference and/or deviation between the torque parameter 20 and the reference parameter 22 is then determined and used to calibrate and/or initialize the steering sensor 10. In the present case, a factory setting for the torque parameter 20, which can in particular be determined in advance using test measurements and stored in the operational memory of the computing unit 30, is used as the reference parameter 22.

Furthermore, a Fourier transform, in particular a fast Fourier transform (FFT), is used in the present case to compare the torque parameter 20 and the reference parameter 22. Provided that the torque parameter 20 corresponds to a nearly perfect sinusoidal signal, the calibration and/or initialization of the steering sensor 10 can be performed directly based on a result of the Fourier transform. In this case, a difference and/or a deviation between the torque parameter 20 and the reference parameter 22 can be determined based on a real and an imaginary component, in particular an angular component, of the result of the Fourier transform and used for calibrating and/or initializing the steering sensor 10. However, due to, e.g., system-immanent deviations or corresponding tolerances, the torque parameter 20 normally deviates more or less strongly from a corresponding sinusoidal signal. In this case, a different evaluation is advantageous. A cross-correlation 24 is used to compare the torque parameter 20 and the reference parameter 22. For this purpose, a cross-correlation 24 is calculated between the torque parameter 20 and the reference parameter 22 and a difference and/or a deviation between the torque parameter 20 and the reference parameter 22 is determined based on a maximum of the cross-correlation 24. The difference and/or deviation determined in this manner can then be used to calibrate and/or initialize the steering sensor 10. The cyclically repeating nature of the torque parameter 20 over the entire deflection range of the steering handle 16 in this context enables calculation of the cross-correlation using the fast Fourier transform (FFT), as well as the inverse fast Fourier transform (IFFT). Regarding the cross-correlation 24, the following applies to the cross-correlation function k:

$k$=IFFT(FFT(ReferenceParameter)·FFT(TorqueParameter))

Figure 2A:
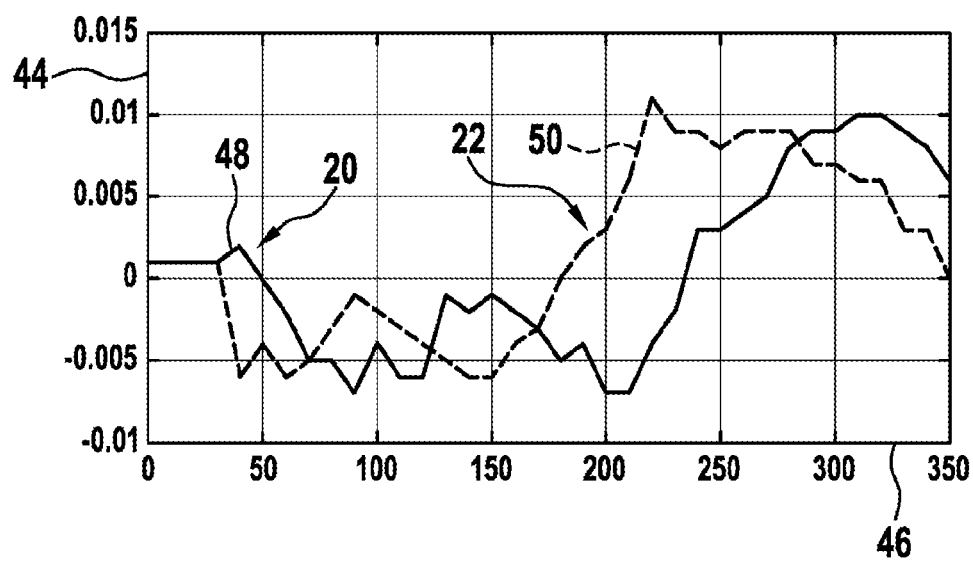
Figure 2B:
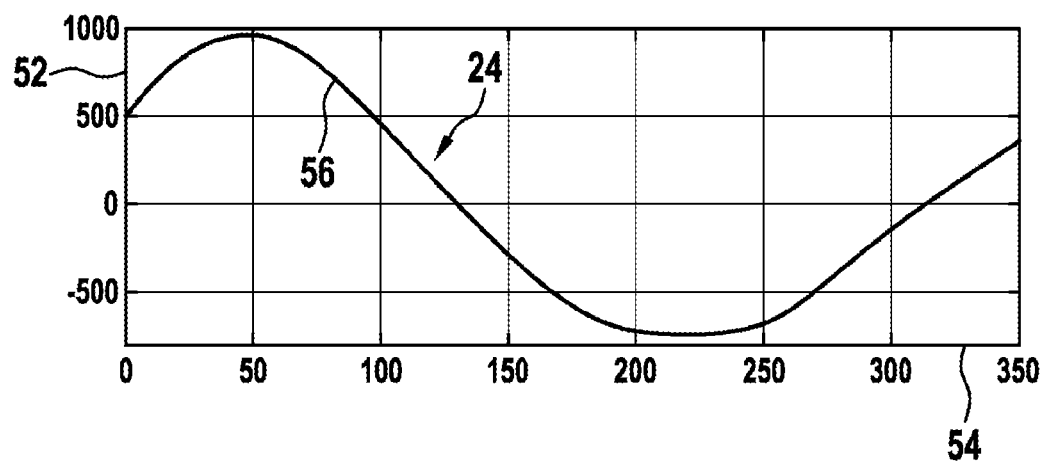

FIGS. 2a and 2b show exemplary diagrams of various signals for calibrating and/or initializing the steering sensor 10.

In FIG. 2a, a torque is plotted in [Nm] on an ordinate axis 44. In this case, a deflection of the steering handle 16, in particular in the form of a steering angle, is shown in [°] on an abscissa axis 46. FIG. 2a shows in particular the entire deflection range of the steering handle 16. A curve 48 shows a progression of the torque parameter 20. A curve 50 shows a progression of the reference parameter 22 corresponding to the torque parameter 20.

The progression of the torque parameter 20 indicates that that the torque determined by means of the torque sensor 18 fluctuates as a function of the deflection positions of the steering handle 16. For this reason, the torque is determined for a plurality of different deflection positions of steering handle 16. In addition, the deflection positions are selected such that they are evenly distributed over the entire deflection region of the steering handle 16. Furthermore, the progression of the torque parameter 20 as well as the reference parameter 22 in the case shown deviates relatively sharply from a sinusoidal signal so that a cross correlation 24 is used to adjust the torque parameter 20 and the reference parameter 22 in this case.

In FIG. 2b, an ordinate axis 52 is designed as a size axis, while on an abscissa axis 54, in turn, a deflection of the steering handle 16, in the present case in the form of a steering angle, is applied in [°]. In this case, a curve 56 shows the cross-correlation 24 calculated from the torque parameter 20 and the reference parameter 22.

A difference and/or a deviation between the torque parameter 20 and the reference parameter 22 can easily be determined based on the cross-correlation 24 shown, and in particular based on a maximum of the cross-correlation 24. The difference and/or deviation determined in this manner can then be used to calibrate and/or initialize the steering sensor 10.

Figure 3:
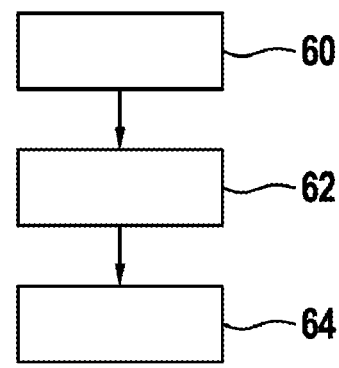

Finally, FIG. 3 shows an exemplary flowchart with the main method steps of a method for calibrating and/or initializing the steering sensor 10.

Method step 60 corresponds to a determination step in which the torque parameter 20 is determined. In this case, a service operation mode is first activated and torque is subsequently determined for multiple, different deflection positions of the steering handle 16 to determine the torque parameter 20 by means of the torque sensor 18. To this end, the steering handle 16 is advantageously deflected by actuating the further actuator unit 26, whereby a corresponding torque is determined when the respective deflection position is reached by means of torque sensor 18. In addition, the corresponding value for the torque along with the corresponding deflection position is saved as a pair of values, e . . . in the operational memory of the computing unit 30.

Method step 62 corresponds to a comparison step in which the previously determined torque parameter 20 is compared with a reference parameter 22 in order to calibrate and/or initialize the steering sensor 10. A Fourier transform, in particular a fast Fourier transform (FFT), is used in the present case to compare the torque parameter 20 and the reference parameter 22. Preferably, a cross-correlation 24 is further calculated between the torque parameter 20 and the reference parameter 22, and a difference and/or deviation between the torque parameter 20 and the reference parameter 22 is determined based on a maximum of the cross-correlation 24.

Method step 64 corresponds to a calibration and/or initialization step in which steering sensor 10 is calibrated and/or initialized. In this case, the difference previously determined, e.g. by means of the fast Fourier transform (FFT) and/or the cross-correlation 24, and/or the deviation previously determined, e.g. by means of the fast Fourier transform (FFT) and/or the cross-correlation 24, is used in order to calibrate and/or initialize the steering sensor 10.

The example flowchart in FIG. 3 is only intended to describe a method for calibrating and/or initializing of steering sensor 10 by way of example. In particular, individual method steps can also vary, or additional method steps can be added. In this context, it is conceivable to, e.g., apply the method accordingly to a conventional steering system, in particular an electric power steering system, whereby a steering actuator is used as the actuator unit in this case for supporting a manual torque applied to a steering handle.

The invention claimed is:

1. A method for calibrating and/or initializing a steering sensor of a steering system in a vehicle, the steering system comprising a steering handle and a torque sensor associated with the steering handle, the method comprising:
   detecting a deflection position of the steering handle using the steering sensor;
   determining a torque parameter by determining a torque for each of a plurality of different detected deflection positions of the steering handle; and
   comparing the determined torque parameter with a reference parameter in order to calibrate and/or initialize the steering sensor.

2. The method according to claim 1, wherein:
   the torque is determined for at least four different deflection positions of the steering handle, and
   the deflection positions are evenly distributed over an entire deflection region of the steering handle.

3. The method according to claim 1, wherein a Fourier transform is used to compare the torque parameter and the reference parameter.

4. The method according to claim 1, wherein a cross-correlation is used to compare the torque parameter and the reference parameter.

5. The method according to claim 4, wherein:
   a difference and/or a deviation between the torque parameter and the reference parameter is determined based on a maximum of the cross-correlation, and
   the determined difference and/or deviation is used in order to calibrate and/or initialize the steering sensor.

6. The method according to claim 1, wherein:
   the steering system comprises at least one actuator unit operatively connected with the steering handle, and
   the steering handle is deflected by actuation of the actuator unit in order to determine the torque parameter.

7. The method according to claim 1, wherein the torque parameter is determined at a time and/or in a state when no contact with the steering handle occurs and/or takes place.

8. A control unit comprising:
   a computing unit configured to perform the method according to claim 1.

9. A vehicle, comprising:
   a steering system including a steering handle, a steering sensor associated with the steering handle and configured to detect a deflection position of the steering handle, and a torque sensor associated with the steering handle for detecting a torque; and
   a computing unit configured to determine a respective torque for a plurality of different deflection positions of the steering handle and to generate a torque parameter based on the determined torque, the computing unit further configured to compare the torque parameter with a reference parameter in order to calibrate and/or initialize the steering sensor.

10. The vehicle according to claim 9, wherein the steering system is a steer-by-wire steering system.

* * * * *